United States Patent
Ogawa

(10) Patent No.: US 10,212,394 B2
(45) Date of Patent: Feb. 19, 2019

(54) SIGNAL PROCESSING APPARATUS FOR FOCUS DETECTION, SIGNAL PROCESSING METHOD, AND IMAGE PICKUP APPARATUS

(71) Applicant: CANON KABUSHIKI KAISHA, Tokyo (JP)

(72) Inventor: Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 807 days.

(21) Appl. No.: 13/910,431

(22) Filed: Jun. 5, 2013

(65) Prior Publication Data
US 2013/0335547 A1    Dec. 19, 2013

(30) Foreign Application Priority Data
Jun. 14, 2012    (JP) .................................. 2012-134906

(51) Int. Cl.
H04N 7/18 (2006.01)
H04N 5/232 (2006.01)

(52) U.S. Cl.
CPC ........... *H04N 7/18* (2013.01); *H04N 5/23212* (2013.01)

(58) Field of Classification Search
None
See application file for complete search history.

(56) References Cited

U.S. PATENT DOCUMENTS

| | | | | |
|---|---|---|---|---|
| 4,562,346 A * | 12/1985 | Hayashi | ............... | G03B 7/0807 250/201.7 |
| 4,745,562 A * | 5/1988 | Prazdny | ................... | G06K 9/20 356/390 |
| 4,878,079 A * | 10/1989 | Hamada | .................... | G02B 7/38 396/121 |
| 4,967,225 A * | 10/1990 | Akashi | ..................... | G02B 7/34 396/104 |
| 5,151,583 A * | 9/1992 | Tokunaga | ................ | G02B 7/34 250/201.2 |

(Continued)

FOREIGN PATENT DOCUMENTS

| EP | 1 085 751 A2 | 3/2001 |
|---|---|---|
| JP | 2001-083407 A | 3/2001 |
| JP | 4591120 B2 | 12/2010 |

OTHER PUBLICATIONS

Wei et al., "Fast Template Matching Based on Normalized Cross Correlation With Adaptive Multilevel Winner Update", IEEE Transactions on Image Processing, vol. 17, No. 11, Nov. 2008.*

(Continued)

*Primary Examiner* — Mohammad J Rahman
(74) *Attorney, Agent, or Firm* — Venable LLP

(57) ABSTRACT

A signal processing apparatus for obtaining a correlation between an A-image signal and a B-image signal which are output from an image pickup unit to be input and calculating a defocus amount includes: a near-in-focus detection unit for detecting a pixel signal in an in-focus state between the A- and B-image signals; and a correlation operation unit for operating a correlation between the A- and B-image signals, wherein the correlation operation unit has a mode for excluding the detected pixel signal in the in-focus state from a subject of the correlation operation in accordance with a detection result of the near-in-focus detection unit.

12 Claims, 8 Drawing Sheets

(56) References Cited

U.S. PATENT DOCUMENTS

| | | | | | |
|---|---|---|---|---|---|
| 5,359,383 | A * | 10/1994 | Miida | ............... | G02B 7/34 250/201.2 |
| 5,659,816 | A * | 8/1997 | Uchiyama | ............... | G02B 7/34 396/121 |
| 6,124,890 | A * | 9/2000 | Muramoto | ............... | H04N 5/23212 348/345 |
| 6,249,608 | B1 * | 6/2001 | Ikeda | ............... | G06T 7/20 382/209 |
| 6,411,782 | B1 * | 6/2002 | Kindaichi | ............... | G02B 7/34 356/3.08 |
| 6,933,978 | B1 * | 8/2005 | Suda | ............... | G02B 7/34 348/345 |
| 7,732,744 | B2 * | 6/2010 | Utagawa | ............... | G02B 3/0056 250/208.1 |
| 2002/0105631 | A1 * | 8/2002 | Nonaka | ............... | G01C 3/08 356/3.14 |
| 2003/0123871 | A1 * | 7/2003 | Yoshida | ............... | G02B 7/34 396/123 |
| 2005/0036128 | A1 * | 2/2005 | Mihara | ............... | G01S 11/12 356/3.14 |
| 2006/0226341 | A1 * | 10/2006 | Washisu | ............... | G02B 7/08 250/208.1 |
| 2007/0237421 | A1 * | 10/2007 | Luo | ............... | G06T 11/60 382/284 |
| 2008/0036883 | A1 * | 2/2008 | Hara | ............... | H04N 5/367 348/246 |
| 2008/0112643 | A1 * | 5/2008 | Kusaka | ............... | G03B 13/32 382/278 |
| 2008/0181499 | A1 * | 7/2008 | Yang | ............... | G06T 7/0083 382/174 |
| 2008/0267601 | A1 * | 10/2008 | Kobayashi | ............... | G03B 13/32 396/91 |
| 2010/0013947 | A1 * | 1/2010 | Oikawa | ............... | G03B 13/36 348/222.1 |
| 2010/0092103 | A1 * | 4/2010 | Ishiga | ............... | H04N 5/3675 382/264 |
| 2010/0104148 | A1 * | 4/2010 | Bovik | ............... | G06K 9/4633 382/128 |
| 2010/0150538 | A1 * | 6/2010 | Ono | ............... | G03B 13/00 396/104 |
| 2010/0176273 | A1 * | 7/2010 | Shimoda | ............... | H01L 27/14623 250/208.1 |
| 2010/0302433 | A1 * | 12/2010 | Egawa | ............... | G02B 7/34 348/345 |
| 2011/0025904 | A1 * | 2/2011 | Onuki | ............... | G02B 7/34 348/360 |
| 2011/0069762 | A1 * | 3/2011 | Yoshino | ............... | G06T 7/0026 375/240.16 |
| 2011/0085786 | A1 * | 4/2011 | Tamaki | ............... | G02B 7/34 396/104 |
| 2011/0228145 | A1 * | 9/2011 | Kimura | ............... | G02B 7/102 348/247 |
| 2011/0298963 | A1 * | 12/2011 | Kato | ............... | H04N 5/3696 348/345 |
| 2012/0099006 | A1 * | 4/2012 | Matsuo | ............... | H04N 5/23212 348/241 |
| 2012/0294485 | A1 * | 11/2012 | Kasaoki | ............... | G06K 9/00805 382/103 |
| 2012/0300104 | A1 * | 11/2012 | Onuki | ............... | H04N 5/23212 348/302 |
| 2012/0300116 | A1 * | 11/2012 | Nakamoto | ............... | H04N 5/23212 348/349 |
| 2012/0307102 | A1 * | 12/2012 | Yuyama | ............... | H04N 5/2355 348/222.1 |

OTHER PUBLICATIONS

Mohammad, "A Fast Globally Optimal Algorithm for Template Matching Using Low-Resolution Pruning", IEEE Transactions on Image Processing, vol. 10, No. 4, Nov. 2001.*

* cited by examiner

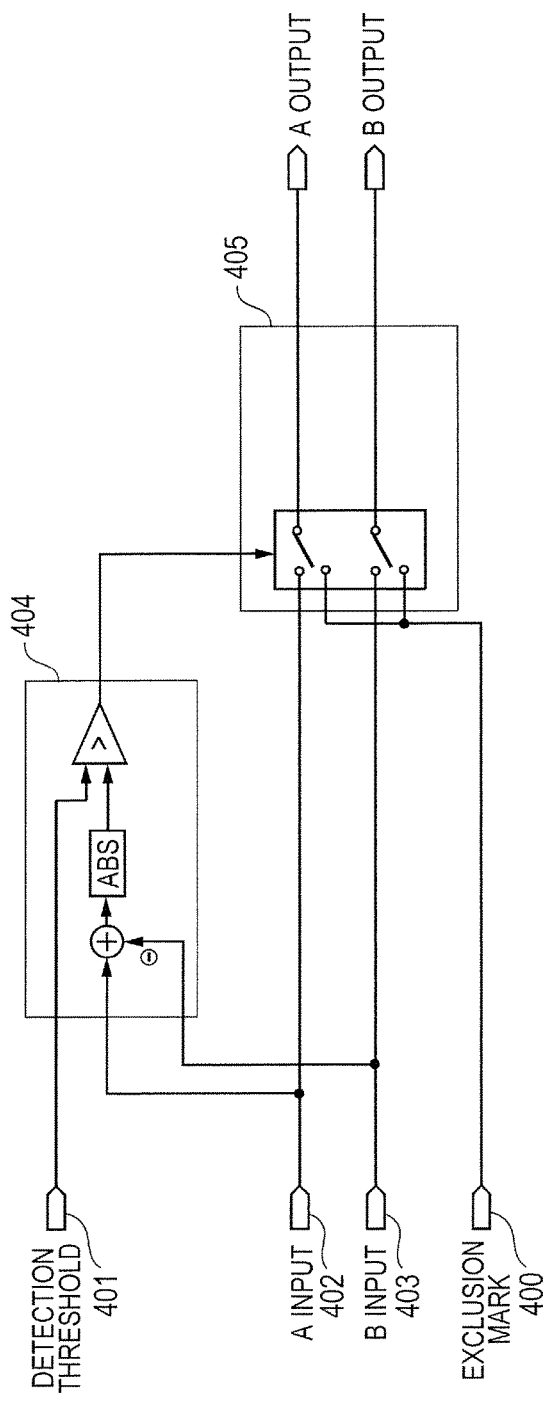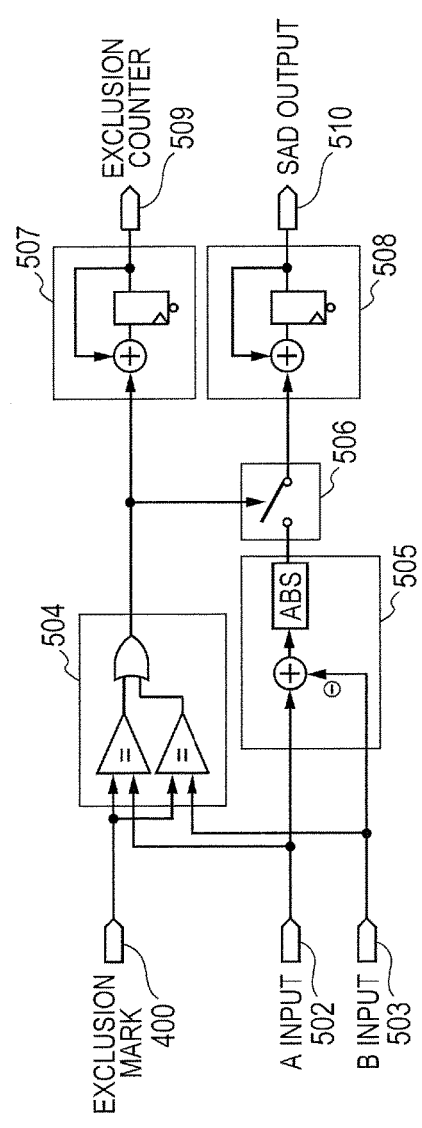

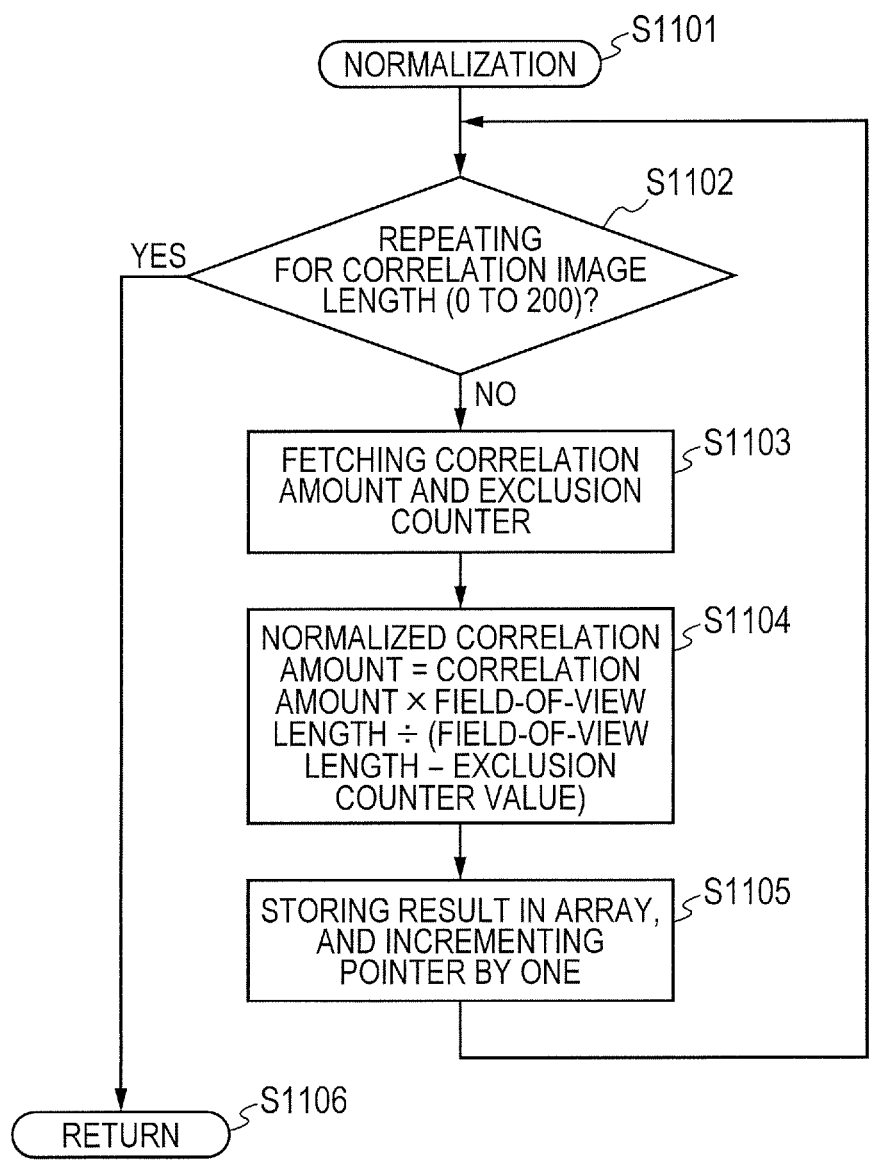

SIGNAL PROCESSING APPARATUS FOR FOCUS DETECTION, SIGNAL PROCESSING METHOD, AND IMAGE PICKUP APPARATUS

BACKGROUND OF THE INVENTION

Field of the Invention

The present invention relates to a focus detection apparatus for performing a focus detection on the basis of a phase difference between pupil-divided images obtained by using an image pickup element in which a plurality of photoelectric conversion units are provided for one microlens and, more particularly, to a signal processing apparatus for performing a focus detection which is not affected by a perspective conflict.

Description of the Related Art

In recent years, such a technique that pupil-separated images are obtained by an image pickup element in which a plurality of photoelectric conversion units are arranged for one microlens, and a focus detection is performed on the basis of a phase difference between the obtained two pupil-divided images has been known.

For example, the Official Gazette of Japanese Patent Application Laid-Open No. 2001-083407 (Patent Literature 1) discloses such a technique that a phase difference is obtained by pupil-separated images to perform a focus detection, and at the same time, all pixels corresponding to a same microlens are added to be handled as one pixel. By adding all of the pixels corresponding to one microlens, they are handled in substantially the same manner as that of a pixel array of an image pickup apparatus in the related art, thereby enabling an image for appreciation to be formed by a signal processing technique in the related art.

The Official Gazette of Japanese Patent No. 4591120 (Patent Literature 2) discloses such a technique that in a contrast AF, when there is a perspective conflict, a portion where a focusing position is already known is masked, thereby detecting another object.

However, according to the related art disclosed in foregoing Patent Literature 2, an attention is paid to an evaluation value of the contrast AF and such a technique cannot be applied, as it is, to a focus detection method using the phase difference of Patent Literature 1.

In a phase difference method which is put into practical use in a single lens reflex camera, the existence of a plurality of focusing positions at the time of a perspective conflict can be discriminated on the basis of ups and downs of a correlation image waveform at the time of a correlation operation.

However, in the case of pupil-dividing an object at an image pickup element plane as shown in Patent Literature 1, it is difficult to recognize the existence of a plurality of focusing positions by the ups and downs of the correlation image waveform.

This is because although a sensor for detecting a phase difference of a single lens reflex camera uses pupil-divided images of a deep depth of field, since the technique of Patent Literature 1 uses the pupil-divided images of a depth of field of the image for appreciation, that technique is largely affected by a focusing state at the time when an image for distance measurement is obtained. It is, therefore, difficult to grasp a perspective conflict state by using the technique of Patent Literature 1.

SUMMARY OF THE INVENTION

It is, therefore, an aspect of the invention to provide a focus detection apparatus which enables a perspective conflict state to be grasped by using the technique of Patent Literature 1.

To accomplish the above aspect, according to the invention, there is provided a signal processing apparatus of the invention, for obtaining a correlation between an A-image signal and a B-image signal which are output from an image pickup unit to be input and calculating a defocus amount, comprising: a near-in-focus detection unit configured to detect a pixel signal in an in-focus state between the A-image signal and the B-image signal; and a correlation operation unit configured to operate a correlation between the A-image signal and the B-image signal, wherein the correlation operation unit has a mode for excluding the detected pixel signal in the in-focus state from a subject of the correlation operation in accordance with a result of the detection by the near-in-focus detection unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a constructional diagram of a signal processing apparatus for focus detection according to the first embodiment of the invention.

FIG. 5 is a circuit constructional diagram of the signal processing apparatus for focus detection according to the first embodiment of the invention.

FIG. 11 is a flowchart for the operation of the signal processing apparatus for focus detection according to the second embodiment of the invention.

DESCRIPTION OF THE EMBODIMENTS

Various exemplary embodiments, features, and aspects of the present invention will be described in detail below with reference to the drawings. The embodiments relate to an example in which the invention has been applied to a focus detection apparatus of an image pickup apparatus such as a digital camera or the like.

Figure 1:
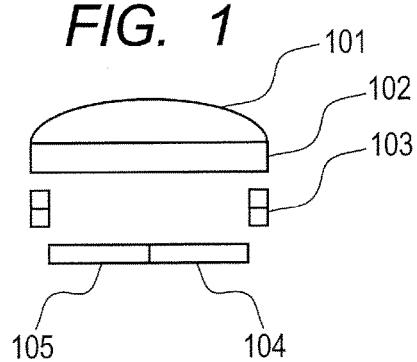
FIG. 1 is a cross sectional view of a pixel of an image pickup element for outputting pupil-divided images.

FIG. 1 is a diagram illustrating a structure of a pixel of an image pickup element which is used as an image pickup unit of the image pickup apparatus to which the invention can be applied.

In the diagram, a microlens 101 is provided to condense object light to a pixel and a color filter 102 is provided. The color filter 102 is a general color filter of the colors such as RGB or the like. The color filters 102 are repeatedly arranged at a predetermined period.

A wiring layer 103 of a semiconductor is provided. Photodiodes (photoelectric conversion units) 104 and 105 are provided to perform a photoelectric conversion.

Although the photodiodes 104 and 105 are constructed as one photoelectric conversion unit in the normal image pickup element, in a pixel structure serving as a prerequisite of the invention, the photoelectric conversion unit is divided into a plurality of units as illustrated in the diagram, thereby obtaining pupil-divided images. The division of the photoelectric conversion unit is not limited to the construction illustrated in FIG. 1 but the number of division and the dividing direction may be appropriately decided in accordance with a setting construction of a focus detection area, or the like.

A parallax occurs between an image constructed by collecting pixel signals only from the photoelectric conversion unit 104 and an image constructed by collecting pixel signals only from the photoelectric conversion unit 105 because a pupil has been divided.

Such a parallax can be used in a field of focus detection, a field for obtaining a stereo image, or the like.

If pixel values of the photoelectric conversion units 105 and 104 are added, the pixel is returned to an image of substantially the same pupil shape as that of a general pixel. Therefore, by executing a general signal processing to the added pixel, an image similar to an image which is obtained by the image pickup element in the related art can be obtained.

A problem of a perspective conflict state will now be described with reference to FIG. 2.

Figure 2:
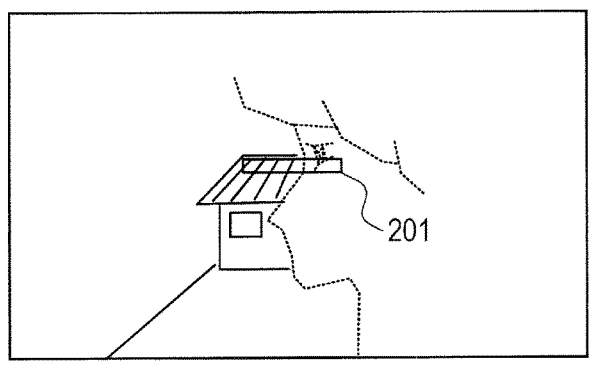
FIG. 2 is a diagram illustrating a photographed image in a perspective conflict state.

FIG. 2 illustrates a photographed image in the perspective conflict state. A distance measurement area 201 is illustrated. The focus detection is performed by obtaining pupil-divided images in the distance measurement area 201 and executing a correlation operation. In the state of FIG. 2, a building in the background is focused to and a human existing on this side is not focused and thus appears as a blurred image.

Figure 7A:
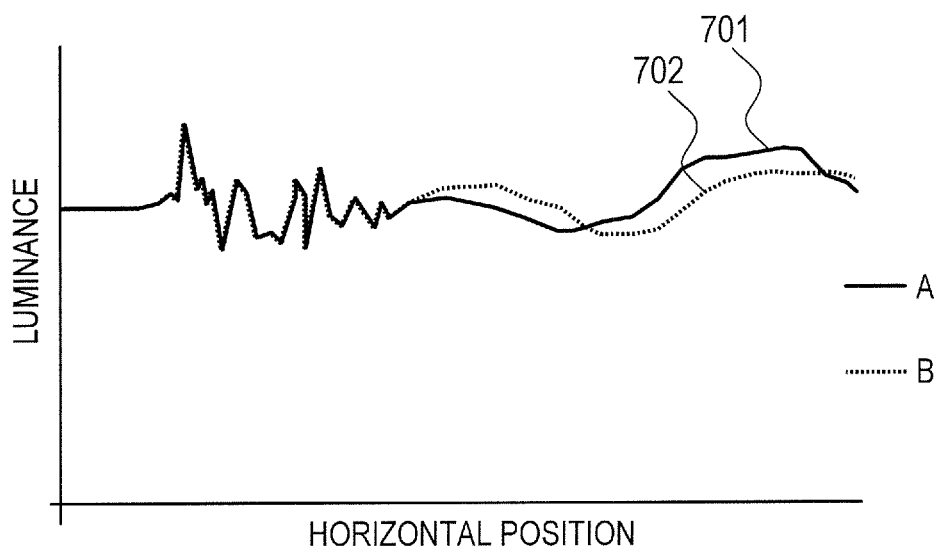
FIGS. 7A and 7B are diagrams illustrating waveforms of pupil-divided images which are obtained by the signal processing apparatus for focus detection according to the first embodiment of the invention.

FIG. 7A illustrates the pupil-divided images 701 and 702 which are obtained from the distance measurement area 201 in the state of FIG. 2. On the left side, since the background is focused, the sharp image is obtained. However, on the right side, the image has been defocused.

Figure 6A:
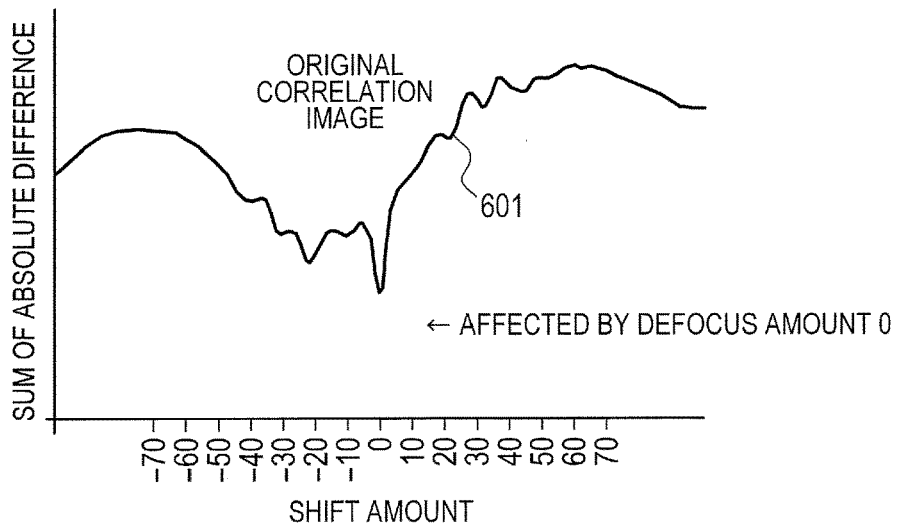
FIGS. 6A, 6B and 6C are diagrams illustrating a correlation image and an exclusion count image which are obtained by the signal processing apparatus for focus detection according to the first embodiment of the invention.

FIG. 6A illustrates a correlation image which is obtained when a correlation operation executed to the pupil-divided images 701 and 702 of FIG. 7A. An axis or abscissa indicates a shift amount of the image and an axis or ordinate indicates a sum of absolute values of differences between the pupil-divided images. This means that the correlation at a position where the sum of the absolute differences is smallest is highest. If a shift position where the correlation is high can be known, by multiplying a shift amount by a predetermined coefficient which is decided by a baseline length, the defocus amount is obtained. The image pickup apparatus controls the driving of a photographing optical system having a focusing lens on the basis of the defocus amount, thereby attaining an in-focus state.

In the case of the image of FIG. 2, it is required that the human on this side is in-focused. In many cases, since an object existing on this side may be a main object, a single lens reflex camera is constructed so as to focus to the object existing on this side. However, when seeing the correlation image of FIG. 6A, the correlation is highest in a portion where the shift amount is equal to 0. As mentioned above, in the case where the correlation image of a shallow depth of field-of-view is used, it is difficult to detect that the object exists on this side. This is because since an image which has already been close to the in-focus state (hereinbelow, referred to as a "near-in-focus" image) is sharper than the blurred image on this side which occupies a large area, this image influences the correlation image more largely. The invention provides a signal processing apparatus for focus detection which enables the object on this side to be focused even in such a situation. An embodiment of the invention will be described in detail hereinbelow with reference to the drawings.

Embodiment 1

Figure 3:
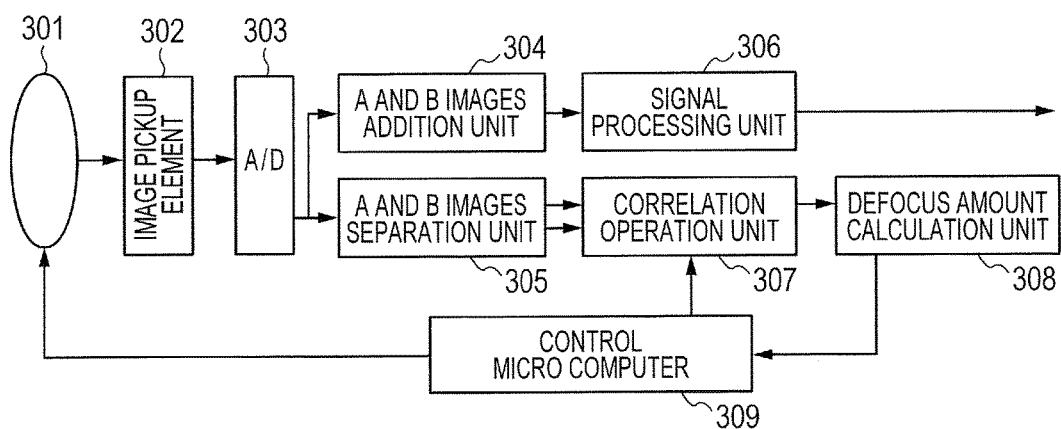
FIG. 3 is a block diagram of a main section of an image pickup apparatus having a focus detection apparatus to which the invention is applied.

FIG. 3 is a block diagram of a main section of the image pickup apparatus having a focus detection apparatus to which the invention is applied. In the diagram, only portions regarding the focus detection apparatus according to the embodiment in the construction of the image pickup apparatus are illustrated and constructing portions which are not particularly concerned with the invention are omitted.

In the diagram, lenses 301 include a focusing lens for focusing object light, and an image pickup element 302 has the pixel structure of FIG. 1. An A/D converter 303 is provided. An A and B image addition unit 304 adds the pupil-divided images and form an original image of an image for appreciation. A signal processing unit 306 is provided.

An A and B image separation unit 305 separates pupil-divided image signals of images A and B which are alternately output from the A/D converter 303. A correlation operation unit 307 is provided. A defocus amount calculation unit 308 calculates a defocus amount. A control micro computer 309 controls the whole camera. The control micro computer 309 has a function for controlling each unit of the image pickup apparatus by loading a control program from a memory (not shown) and executing it.

FIG. 4 is a constructional diagram of a signal processing circuit according to the present embodiment, which constructs the correlation operation unit 307 corresponding to the signal processing apparatus for focus detection of the invention.

In the diagram, inputs 402 and 403 of the pupil-divided images which are separated by the A and B image separation unit 305 are illustrated. The A-image input 402 and the B-image input 403 are shown. In a near-in-focus detection circuit 404, whether or not an absolute value of a difference between the images A and B (402 and 403) is larger than a threshold input 401 is comparison-discriminated and, when it is determined as a result of the discrimination that the absolute value is not larger than the threshold input 401, an image signal (pixel signal) is replaced with an exclusion mark. By this circuit, a portion (pixel signal) where the values of the images A and B are close is detected. The detection threshold value 401 is an appropriate value given from the outside of the signal processing apparatus by the control micro computer 309. If a value smaller than the detection threshold value 401 is set, such a function can be substantially turned off. As a construction for turning off the function, in place of decreasing the threshold value 401, it is also possible to provide a switch at an output side of the near-in-focus detection circuit 404 and turn off this switch.

Figure 7B:
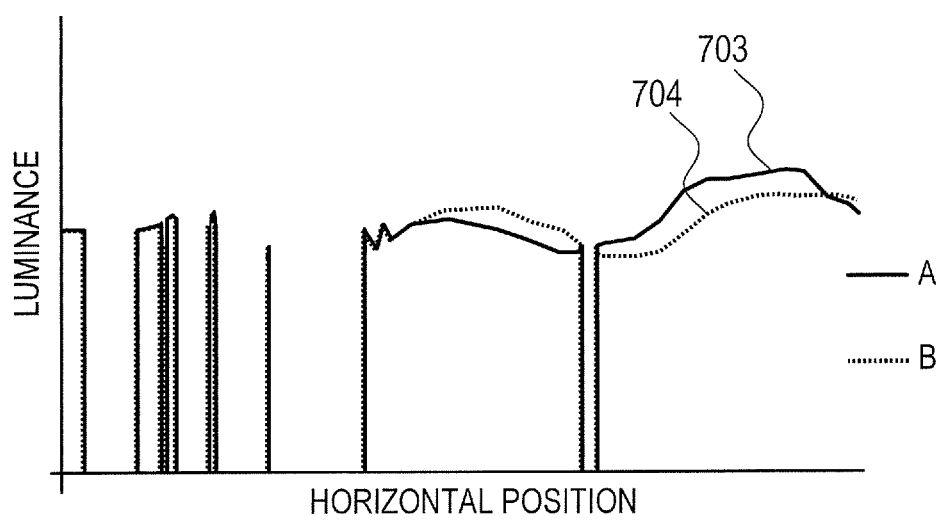

An output of the near-in-focus detection circuit 404 is input to an exclusion mark replacement circuit 405. The exclusion mark replacement circuit 405 replaces the image signals 402 and 403 with an exclusion mark 400 at timing when the near-in-focus detection circuit 404 detects the near-in-focus. The exclusion mark 400 is added into the pupil-divided image signals by a preset value such as 0 (zero value) which cannot occur as a normal signal. The input image signals 402 and 403 in the near-in-focus conflict state in FIG. 2 are such as signals 701 and 702 illustrated in FIG. 7A and outputs of the exclusion mark replacement circuit 405 at that time are such as signals 703 and 704 illustrated in FIG. 7B. All portions where the difference between the images A and B is small are replaced with 0 and only portions where there is a level difference between the images A and B are left. When the function of the near-in-focus detection circuit 404 is turned off by the switch as mentioned above, control is made so as to connect the switch of the exclusion mark replacement circuit 405 to the input side of the separated images.

Figure 6B:
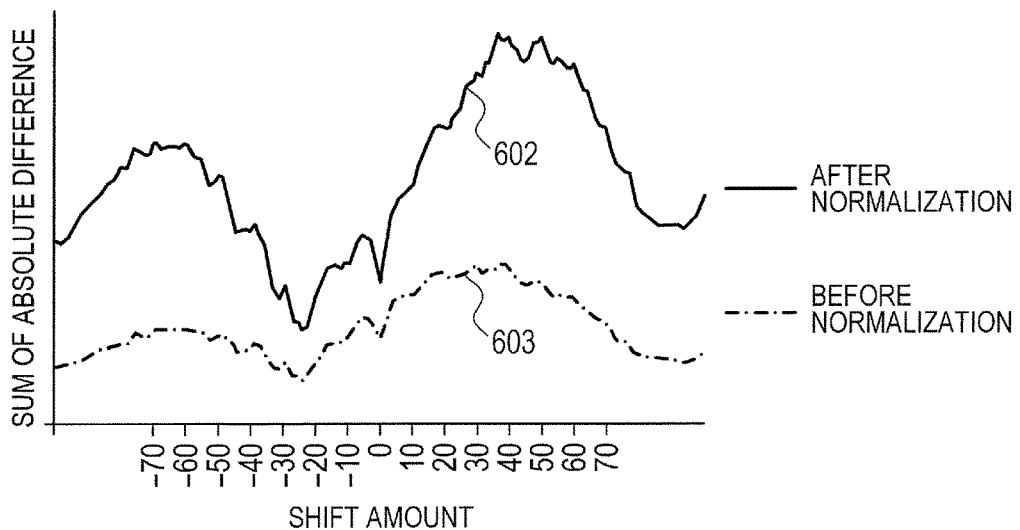

The correlation operation unit 307 integrates the absolute values of the differences while shifting the images A and B obtained by the signal processing circuit in FIG. 4 and obtains a correlation image. FIG. 5 is a constructional diagram of the circuit for obtaining the correlation image by integrating the absolute values of the differences. In the circuit, an A-image input 502 and a B-image input 503 are repeatedly input for an AF field-of-view (distance measurement area 201) and one SAD (Sum of Absolute Difference) output 510 is output. Phases of the images A and B are shifted by one, the pixels which face each other are changed, and thereafter, the A-image input 502 and the B-image input 503 are repeatedly input again for the AF field-of-view, thereby obtaining the SAD output 510 to such a shift amount. By this repetition, the correlation images as illustrated in FIGS. 6A and 6B can be obtained. Since a sync signal generator and a memory control circuit for repeating the inputs are not largely concerned with the essence of the invention, they are not shown and their detailed description is omitted here.

The circuit of FIG. 5 will be described further in detail.

The exclusion mark is added to the A-image input 502 and the B-image input 503 by the circuit shown in FIG. 4. An exclusion mark detection circuit 504 compares the values of the input image signals with the value of the exclusion mark 400, thereby detecting whether or not the exclusion mark has been added to either the A-image input 502 or the B-image input 503. When the exclusion mark detection circuit 504 detects the exclusion mark, a switch 506 is turned off. Therefore, an output of a calculation circuit 505 of the absolute value of the difference is not transferred and the absolute value of the difference in its adding-up cycle is not input to an adding-up circuit 508. At the same time, the number of times of exclusion which is performed is counted by an exclusion counter 507. As mentioned above, since the adding-up in the case where the exclusion mark is added to the input image signal is not executed, a correlation waveform as shown at 603 in FIG. 6B can be obtained. In the correlation waveform 603, it can be confirmed that a correlation amount is not largely affected by the defocus amount 0 as shown by a waveform 601.

Figure 6C:
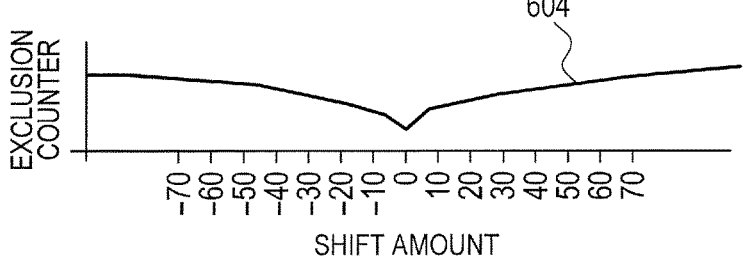

When the exclusion mark is added to either the image A or the image B as mentioned above, the adding-up is excluded from the adding-up of the difference value in the correlation operation. Therefore, the number of times of detection of the exclusion mark which is counted differs in dependence on a combination of the images A and B which face each other. A waveform 604 showing a change of a exclusion counter value obtained by the exclusion counter 507 to the shift amount is illustrated in FIG. 6C. In many cases, the exclusion counter counts the minimum value at the shift amount 0. In the waveform 603, since the number of pixels which are added up differs in dependence on the shift amount, the waveform approaches the correct waveform but is not still correct. Thus, the waveform 604 of the exclusion counter is generated and normalized in accordance with the following equation (1) by the pixel obtained by adding up the waveform 603.

Normalized image value=exclusion image value×the number of AF field-of-view pixels÷(the number of AF field-of-view pixels−exclusion counter value)      (1)

An image normalized by the equation (1) is shown as a waveform 602.

Before the shift amount is converted into the defocus amount, a sub-pixel matching is performed and a shift amount of a decimal point and below is obtained. However, with respect to at least several correlation values which are used in the sub-pixel matching operation, if the normalized value is used, a defocus amount calculation precision is improved.

The focus detection in which the object in the near-in-focus state is excluded as mentioned above can be performed.

Figure 8:
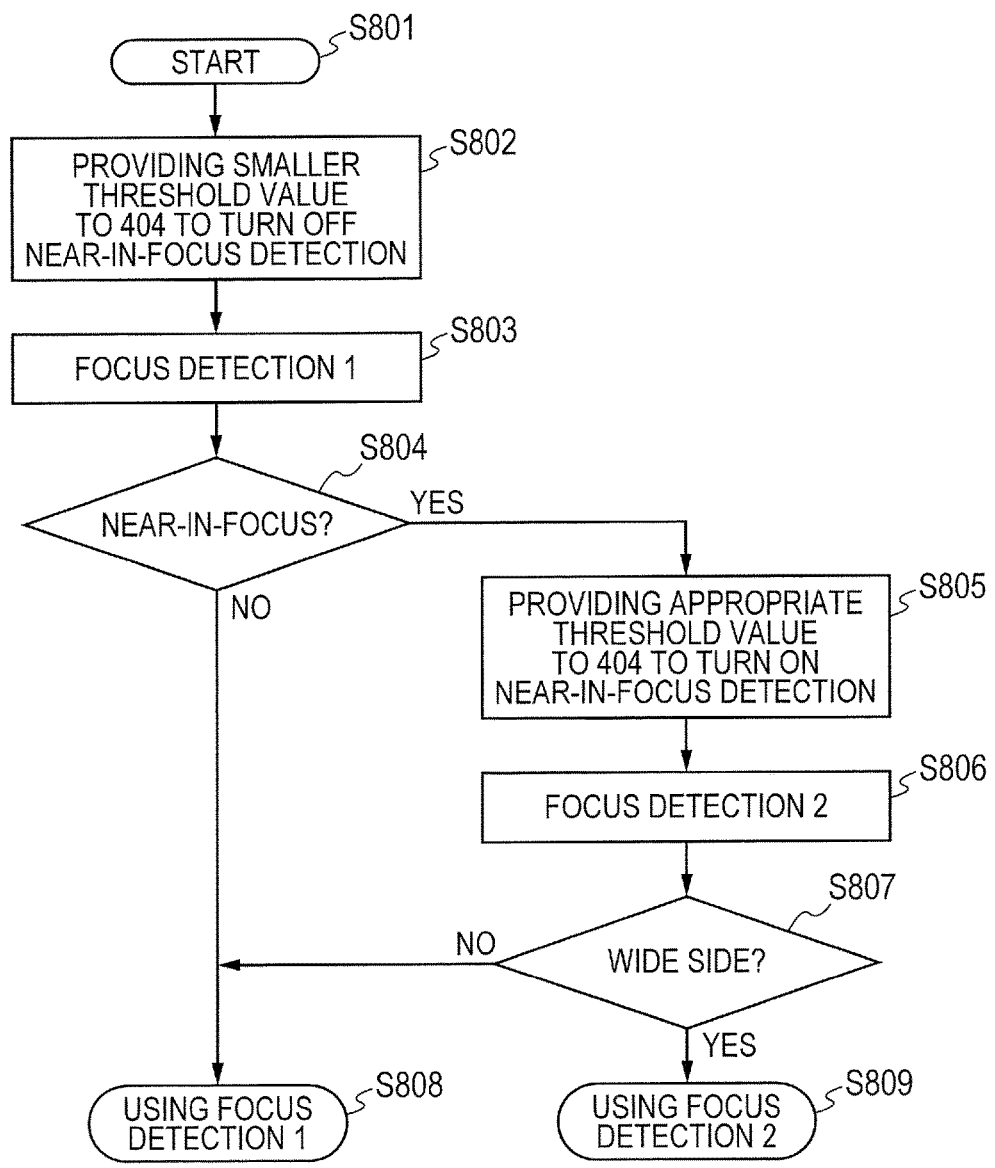
FIG. 8 is a flowchart for the focus detecting operation using the signal processing apparatus for focus detection according to the first embodiment of the invention.

A procedure in which the control micro computer 309 excludes the near-in-focus object and detects a focal point on the near distance side will be described with reference to FIG. 8. The operation according to this procedure is executed under control of the control micro computer 309 of the image pickup apparatus having the focus detection apparatus having the signal processing apparatus according to the embodiment.

In step S801, the focus detection is started. In step S802, a small value is set into the threshold 400 of the near-in-focus detection circuit 404 by the control micro computer 309 and the near-in-focus detection function is turned off. Under such a setting condition, in step S803, the first focus detection including the signal processing by the construction of FIGS. 4 and 5 is performed.

If it is not determined in step S804 that a result of the focus detection in step S803 indicates the near-in-focus, the result of the first focus detection in step S803 is used. The processing routine is finished in step S808.

If it is determined in step S804 that the result of the focus detection in step S803 indicates the near-in-focus, the processing routine advances to step S805. In step S805, an appropriate value is set into the threshold 400 of the near-in-focus detection by the control micro computer 309 and the near-in-focus detection function is validated (turned on). In step S806, the second focus detection including the signal processing according to the construction of FIGS. 4 and 5 is performed.

In step S807, whether or not the object is at a distance on the near side as a result of the second focus detection in step S806 is discriminated. If the object is not at the distance on the near side, the processing routine advances to step S808 and the result of the first focus detection is used. On the other hand, if it is decided in step S807 that the object is at the distance on the near side, the result of the second focus detection in step S806 is used in step S809.

As mentioned above, even if the pupil-divided images of the shallow depth of field-of-view are used, such a correlation operation that the focal point of the object on the near side can be detected without being affected by the focus state can be performed. Therefore, for example, even in the phase difference AF using the image pickup element having the pixel structure as illustrated in FIG. 1, the selective focus detection to the object existing on the near side can be performed.

Embodiment 2

The second embodiment of the invention will be described hereinbelow with reference to FIGS. 9 to 11.

Although the correlation operation unit 307 is constructed by the operation circuit in the first embodiment, in the second embodiment, the function of the correlation operation unit 307 illustrated in FIGS. 4 and 5 is realized by a micro computer. Although the micro computer may be provided as a correlation operation unit, the control micro computer 309 of the image pickup apparatus may be allowed to have such a function.

Figure 9:
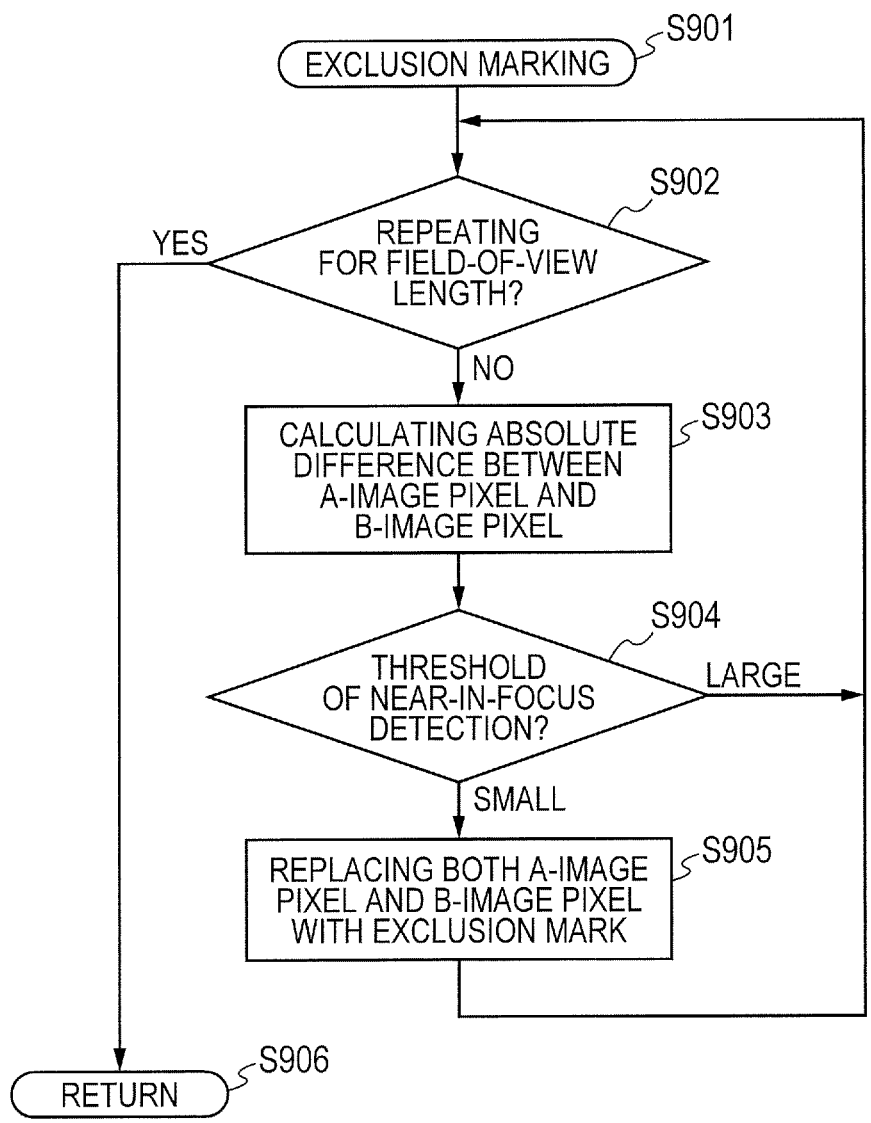
FIG. 9 is a flowchart for the operation of a signal processing apparatus for focus detection according to the second embodiment of the invention.

FIG. 9 shows a flowchart for the processing operation in the case where the circuit of FIG. 4 is installed by the micro computer. This operation is also the operation which is executed in step S803 or S806 in FIG. 8.

The above operation is such an operation that a processing is started in step S901, the value 400 of the exclusion mark is properly set, a processing loop of steps S902 to S905 is repeated for the AF field-of-view length, and an exclusion marking processing is executed to all pixels in the field-of-view.

Specifically speaking, the absolute value of the difference between the A-image pixel and the B-image pixel which face each other is calculated in step S903.

Subsequently, in step S904, whether or not a result of the calculation of step S903 is larger than the threshold value 400 of the near-in-focus detection is comparison-discriminated. If it is smaller than or equal to the threshold value 400, the processing routine advances to step S905. If it is larger than the threshold value, no processing is executed and the processing routine is returned to step S902. The near-in-focus detection threshold 400 is a value which is appropriately set by the control micro computer 309 in step S802 or S805.

Both of the A-image pixel and the B-image pixel are replaced with the exclusion mark in step S905 and the processing routine is returned to step S902. If all of the repetition processings are finished in step S902, the processing routine advances to step S906 and is terminated.

Figure 10:
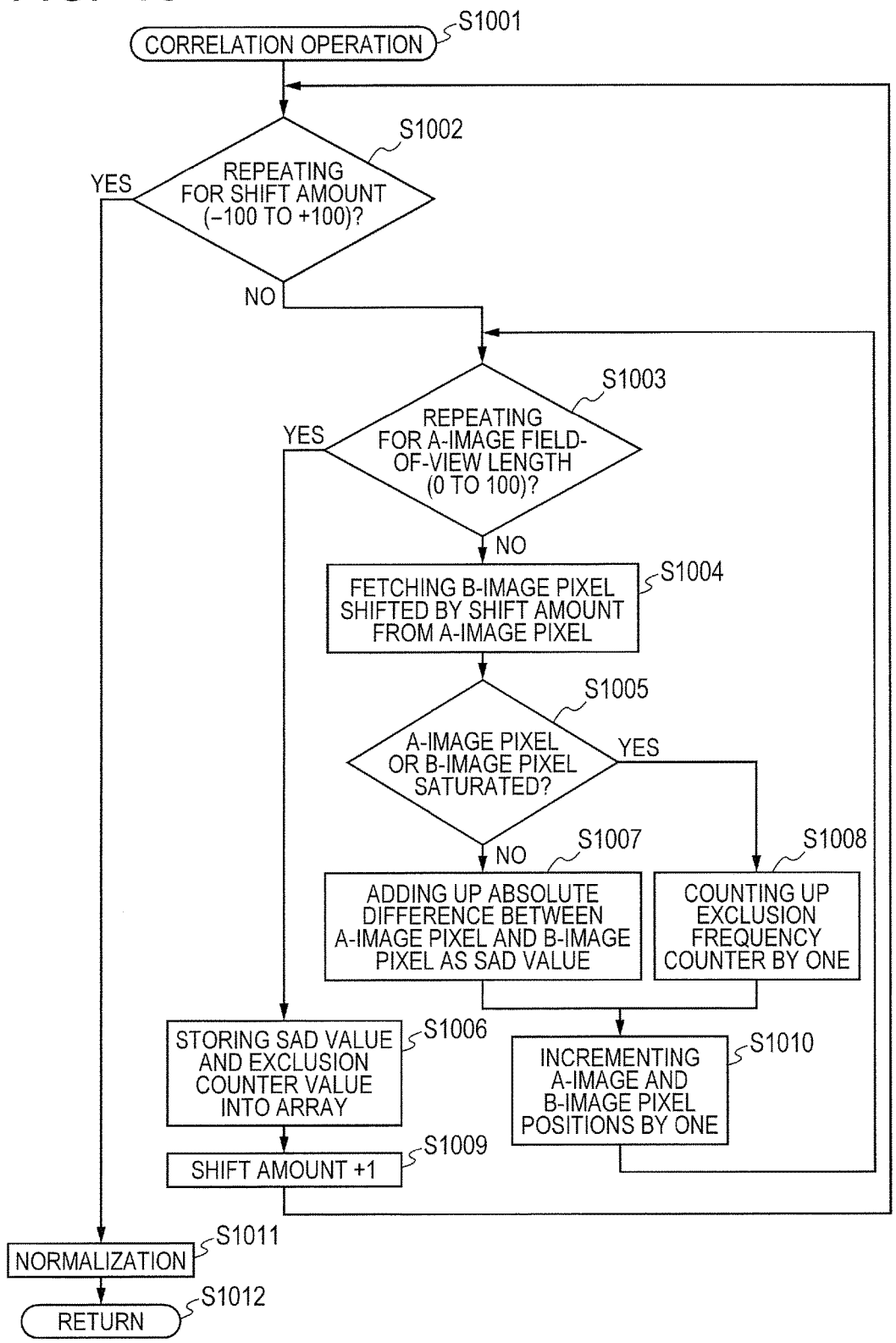
FIG. 10 is a flowchart for the operation of the signal processing apparatus for focus detection according to the second embodiment of the invention.

FIG. 10 is a flowchart for the processing operation in the case where the circuit of FIG. 5 is installed by the micro computer. This processing operation is also executed in step S803 or S806 in FIG. 8.

When the correlation operation is started in step S1001, a processing for repeating the correlation amount adding-up operation to each shift amount (it is assumed to be equal to −100 to +100 here) is started in step S1002.

In step S1003, the processing for repeating the correlation amount adding-up operation the number of times as many as the number of pixels of the A-image field-of-view is started.

In step S1004, the pixel at the position of the B-image pixel which is shifted by each shift amount from the position of the A-image pixel is fetched, respectively.

In step S1005, whether or not the A-image pixel or the B-image pixel is the exclusion mark is discriminated. If the A- or B-image pixel is the exclusion mark, the processing routine advances to step S1008 and an exclusion frequency counter is counted up by one.

If both of the A-image pixel and the B-image pixel are not the exclusion mark in step S1005, step S1007 follows and the absolute value of the difference between the A-image pixel and the B-image pixel is added up as an SAD value. Thus, only the signals other than the pixel signal with the exclusion mark can be used for the correlation operation.

In step S1010, the pixel positions of the images A and B are shifted by one by incrementing by +1 and the processing routine is returned to step S1003.

After a processing loop of steps S1003 to S1010 is repeated for the field-of-view length, step S1006 follows and the SAD value and the exclusion counter value are stored into a memory in association with the shift amount.

In step S1009, the shift amount is shifted by one by incrementing by +1 and the processing routine is returned to step S1002.

A processing loop of steps S1002 to S1009 is repeated. After this processing loop is repeated for the shift amount and the correlation image and the exclusion counter value are calculated, step S1011 follows.

In step S1011, the correlation image is normalized. In step S1012, the correlation operation processing is finished.

FIG. 11 is a detailed flowchart for the normalization operation in step S1011 in FIG. 10.

In step S1101, the normalization is started.

In step S1102, the repetition of a correlation image length (0 to 200) is started.

In step S1103, the correlation amount and the exclusion counter value stored in step S1006 are extracted from the memory.

In step S1104, the correlation amount is multiplied by (field-of-view length÷(field-of-view length−exclusion counter value)), thereby normalizing.

In step S1105, a result of step S1104 is rewritten into the memory, a pointer is progressed by one, and the processing routine is returned to step S1102.

After a processing loop of steps S1102 to S1105 is repeated for the field-of-view length, step S1106 follows and the processing routine is returned.

Although whether or not the pixel is the near-in-focus pixel is discriminated by using the difference between the A-image pixel and the B-image pixel in both of the first and second embodiments, the near-in-focus pixel may be detected on the basis of a frequency component or a shape.

According to the invention as mentioned above, the focus detection apparatus which enables the near-in-focus conflict state to be detected by using the pupil-divided images of the shallow depth of field can be provided.

The functions of the processings shown in FIGS. 8 to 11 are realized by a method whereby a program for realizing the functions of the processings is read out of the memory (not shown) and the control micro computer 309 or the like executes the program.

However, the invention is not limited to the foregoing construction but all or a part of the functions of the processings shown in FIGS. 8 to 11 may be realized by dedicated hardware. The foregoing memory may be constructed by a computer-readable and writable storage medium. For example, the memory may be constructed by a magnetooptic disk device, a non-volatile memory such as a flash memory or the like, a read only recording medium such as a CD-ROM or the like, a volatile memory other than a RAM, or a combination of them.

The processings shown in FIGS. 8 to 11 may be executed by a method whereby the program for realizing the functions of the processings is recorded into a computer-readable recording medium and the program recorded in the recording medium is read out into a computer system and executed. It is now assumed that "computer system" mentioned here includes an OS and hardware such as peripheral equipment or the like. Specifically speaking, the invention incorporates a case where the program read out of the storage medium is written into a memory provided for a function expanding board inserted in the computer or a function expanding unit connected to the computer. In this case, after the program is written, a CPU or the like provided for the function expanding board or function expanding unit executes a part or all of actual processings on the basis of instructions of the program, and the functions of the embodiments mentioned above are realized by those processings.

"computer-readable recording medium" denotes a portable medium such as flexible disk, magnetooptic disk, ROM, CD-ROM, or the like, or a storage apparatus such as a hard disk or the like built in the computer system. Further, "computer-readable recording medium" incorporates a volatile memory (RAM) in the computer system serving as a server or a client in the case where the program is transmitted through a network such as Internet or the like or a communication line such as a telephone line or the like. As mentioned above, it is assumed that a memory which holds the program for a predetermined time is also incorporated in "computer-readable recording medium".

The program may be transmitted from the computer system in which the program has been stored in the storage apparatus or the like to another computer system through a transmission medium or by a transmission wave in the transmission medium. "transmission medium" for transmitting the program here denotes a medium having a function for transmitting information such as network (communication network) like Internet or the like or communication line (communication wire) like a telephone line or the like.

The program may be a program for realizing a part of the foregoing functions. Further, the program may be what is called a differential file (differential program) which can realize the foregoing functions by a combination with a program which is already recorded in the computer system.

A program product such as a computer-readable recording medium or the like in which the foregoing program has been recorded can be also applied as an embodiment of the invention. The foregoing program, recording medium, transmission medium, and program product are also incorporated in the purview of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-134906 filed on Jun. 14, 2012, which is hereby incorporated by reference herein in its entirety.

What is claimed is:

1. A signal processing apparatus for processing image signals, which are acquired from an image sensor arranged with a plurality of pixels, comprising:
   at least one processor; and
   a memory,
   wherein the at least one processor is configured to function as:
      a correlation operation unit configured to perform a correlation operation with shifting of an A-image signal and a B-image signal respectively corresponding to a plurality of predetermined pixels of the image sensor,
      an acquiring unit configured to acquire a defocus amount based on an output of the correlation operation, and
      a control unit configured to determine image signals, included within the A-image signal and the B-image signal, with which the correlation operation is not to be performed, based on a comparison of a difference between the A-image signal and the B-image signal with a predetermined value, and to control the correlation operation unit to perform the correlation operation based on portions of the A-image signal and the B-image signal other than the determined image signals without performing the correlation operation on the determined image signals, and
   wherein the acquiring unit is configured to acquire the defocus amount based on the output of the correlation operation performed in the correlation operation unit which is based on the portions of the A-image signal and B-image signal other than the determined image signals.

2. An apparatus according to claim 1, wherein the control unit determines that the correlation operation is not to be performed on the image signals for which the differences between the corresponding image signals of the A-image signal and the B-image signal are less than the predetermined value.

3. An apparatus according to claim 1, wherein the control unit includes: a discrimination unit configured to comparison-discriminate the predetermined value, which is provided from outside of the apparatus, with a difference between the plurality of image signals and determine the image signals for which the correlation operation is not to be performed; and a replacement unit configured to replace the determined image signals with signals of a preset value in accordance with a result of the discrimination by the discrimination unit and output the plurality of image signals.

4. An apparatus according to claim 3, wherein the correlation operation unit includes:
   an operation unit configured to perform a correlation operation of the image signals which are output from the control unit;
   a image signal detection unit configured to detect the image signals of the preset value included in the image signals which are output from the control unit; and
   an input control unit configured to control the input of the image signals which are output from the control unit to the operation unit in accordance with a result of the detection by the image signal detection unit.

5. An apparatus according to claim 4, wherein the correlation operation unit includes:
   a count unit configured to count the number of times of the detection at the time when the image signal of the predetermined value is detected by the image signal detection unit; and
   a normalization unit configured to normalize an output of the operation unit on the basis of the number of detection times counted by the count unit.

6. An apparatus according to claim 5, wherein the correlation operation unit generates a waveform of the number of detection times corresponding to the output of the operation unit on the basis of the number of detection times counted by the count unit, and the normalization unit normalizes the output of the operation unit on the basis of the waveform.

7. A method for processing image signals, which are acquired from an image sensor arranged with a plurality of pixels, comprising:

determining image signals included within an A-image signal and a B-image signal for which a correlation operation is not to be performed, based on a comparison of a difference between the A-image signal and the B-image signal with a predetermined value, the A-image signal and the B-image signal respectively corresponding to a plurality of predetermined pixels of the image sensor;

performing a correlation operation with shifting of the A-image signal and the B-image signal, based on portions of the A-image signal and the B-image signal other than the determined image signals determined in the determining step without performing the correlation operation on the determined image signals; and acquiring a defocus amount based on an output of the correlation operation performing step, wherein the acquiring step is configured to acquire the defocus amount based on the output of the correlation operation performed in the correlation operation step which is based on the portions of the A-image signal and B-image signal other than the determined image signals.

8. A method according to claim 7, wherein the determining step determines that the correlation operation is not to be performed on the image signals for which the differences between the corresponding image signals of the A-image signal and the B-image signal are less than the predetermined value.

9. A method according to claim 8, wherein the determining step includes:

comparison-discriminating the predetermined value, which is externally-provided, with a difference between the plurality of image signals and determining the image signals for which the correlation operation is not to be performed; and replacing the determined image signals with signals of a preset value in accordance with a result of the discrimination by the comparison-discriminating step and outputting the plurality of image signals.

10. A method according to claim 9, wherein the correlation operation performing step includes:

performing a correlation operation of the image signals which are output from the determining step;

detecting the image signals of the preset value included in the image signals which are output from the determining step; and controlling the input of the image signals which are output from the determining step to the image signal correlation operation performing step in accordance with a result of the detection by the preset value image signal detecting step.

11. A method according to claim 10, wherein the correlation operation performing step includes:

counting the number of times of the detection at the time when the image signal of the predetermined value is detected by the preset value image signal detecting step; and normalizing an output of the image signal correlation operation performing step on the basis of the number of detection times counted by the counting step.

12. A method according to claim 11, wherein the correlation operation performing step generates a waveform of the number of detection times corresponding to the output of the image signal correlation operation performing step on the basis of the number of detection times counted by the counting step, and the normalizing step normalizes the output of the image signal correlation operation performing step on the basis of the waveform.

* * * * *